(12) United States Patent
Mehr et al.

(10) Patent No.: US 9,838,400 B2
(45) Date of Patent: *Dec. 5, 2017

(54) SYSTEM AND METHOD FOR VALIDATING USERS USING SOCIAL NETWORK INFORMATION

(71) Applicant: Zoosk, Inc., San Francisco, CA (US)

(72) Inventors: Alexander F. Mehr, San Francisco, CA (US); Shayan G. Zadeh, San Francisco, CA (US)

(73) Assignee: Zoosk, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,662

(22) Filed: May 1, 2017

(65) Prior Publication Data
US 2017/0237746 A1 Aug. 17, 2017

Related U.S. Application Data

(63) Continuation of application No. 13/573,767, filed on Oct. 3, 2012, now Pat. No. 9,639,695.

(60) Provisional application No. 61/626,828, filed on Oct. 3, 2011.

(51) Int. Cl.
| H04L 29/06 | (2006.01) |
| G06F 21/55 | (2013.01) |
| G06Q 50/00 | (2012.01) |

(52) U.S. Cl.
CPC .......... *H04L 63/105* (2013.01); *G06F 21/552* (2013.01); *G06Q 50/01* (2013.01); *H04L 63/1425* (2013.01); *G06F 2221/034* (2013.01)

(58) Field of Classification Search
None
See application file for complete search history.

(56) References Cited

U.S. PATENT DOCUMENTS

| 9,306,927 | B2* | 4/2016 | Vernal | G06F 21/41 |
| 9,419,967 | B2* | 8/2016 | Kritt | G06Q 50/01 |
| 2004/0205002 | A1* | 10/2004 | Layton | G06Q 30/02 705/26.1 |
| 2011/0106610 | A1* | 5/2011 | Landis | G06Q 30/02 705/14.39 |
| 2011/0276689 | A1* | 11/2011 | Rosen | G06F 17/3087 709/224 |
| 2011/0282750 | A1* | 11/2011 | Rosen | G06F 17/3087 705/14.66 |
| 2012/0192258 | A1* | 7/2012 | Spencer | H04W 12/06 726/7 |
| 2014/0156750 | A1* | 6/2014 | De Cristofaro | G06Q 10/1095 709/204 |
| 2014/0289237 | A1* | 9/2014 | Wang | G06Q 30/02 707/727 |

* cited by examiner

*Primary Examiner* — Jeffery Williams
(74) *Attorney, Agent, or Firm* — Innovation Partners; Charles E. Gotlieb

(57) ABSTRACT

A system and method uses any or all of information of a user and/or user's activity at a second web site, information of the user's friends or other connections at the second web site, or registration information of the user, to determine whether to allow the user to communicate with other users of a first web site, prevent the user from communicating with other users of the first web site, or monitor the user's communications and allow or prevent the user from further communication based on the monitored communications at the first web site.

18 Claims, 4 Drawing Sheets account monitor manager 466

Weights Update manager 470

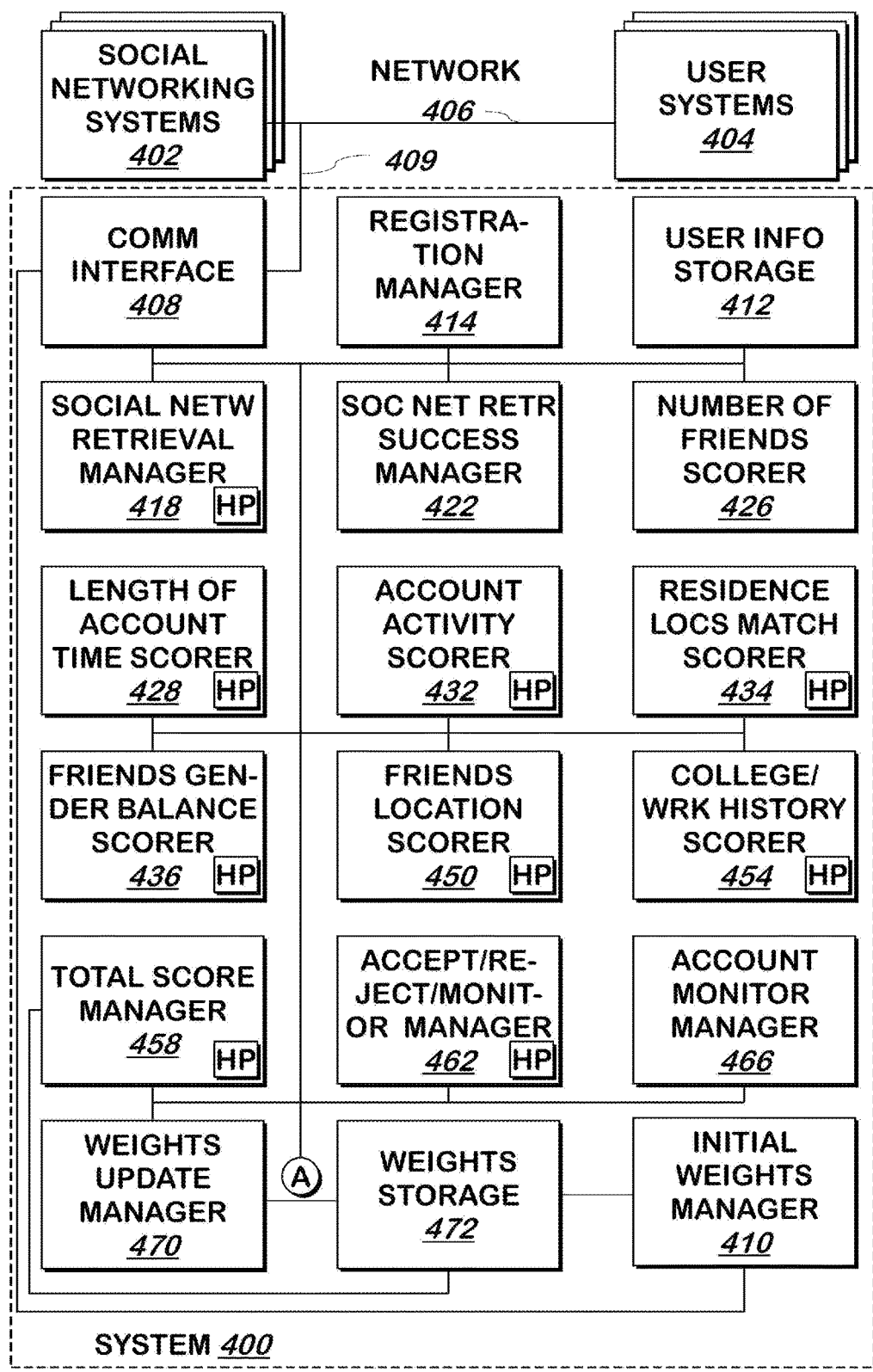
FIG. 4A  HP = PROCESSOR 160

SYSTEM AND METHOD FOR VALIDATING USERS USING SOCIAL NETWORK INFORMATION

RELATED APPLICATION

This application is a continuation of U.S. patent application Ser. No. 13/573,767 entitled, "System and Method for Validating Users Using Social Network Information", filed by Alex F. Mehr and Shayan G. Zadeh on Oct. 3, 2012, which claims the benefit of U.S. Provisional Application Ser. No. 61/626,828 entitled, "Method and Apparatus for Validating Users Using Social Network Information" filed by Alex F. Mehr and Shayan G. Zadeh on Oct. 3, 2011 and each is hereby incorporated by reference in its entirety.

FIELD OF THE INVENTION

The present invention is related to computer software and more specifically to computer software for validating users.

BACKGROUND OF THE INVENTION

Some web sites allow users to communicate with other users of that web site. However, in some instances, user accounts are set up for malicious purposes, such as to send unauthorized advertisements to other users or for other malicious purposes. What is needed is a system and method that can reduce or eliminate the number of such accounts.

SUMMARY OF INVENTION

A system and method receives from a user of a primary web site the user identifier and password of that user on one or more social networking web sites, which may be different from, and operated by an entity independent of (e.g. not controlled by or controlling) the operator of, the primary web site. As used herein, a social networking web site is described, however a social networking web site may include a conventional social networking site such as FACEBOOK, LINKEDIN or GOOGLE+, or it may include any other site in which the user participates in activities, such as a gaming web site, a messaging web site such as TWITTER, or any other type of web site that may or may not include social network features. Thus, where a social network web site is described, any second web site may be used, provided the user performs an activity on that web site that can be used to determine more probably than not if the user has an account on such second web site to legitimately use the services of that second web site.

If the social networking web site is not operated by an entity independent of the owner of the primary web site, the function of the primary web site may be different from the function of the social networking web site. For example, the primary web site may have a function of facilitating dating between users who may not know each other before discovering each other on the primary web site, and the social network web site may be a conventional social network used to connect people who mostly know each other from sources other than the social network or friends or other connections of such people.

Information retrieval from the social networking web sites is attempted, and if the attempt fails, the account is rejected. Otherwise, the information retrieved from the social networking web sites is analyzed, either by itself or in conjunction with information the user supplied to the primary web site to determine whether the user account should be allowed, rejected, or monitored for suspicious activity and/or revisited to identify the activity of that user at a later time. Rejected accounts are denied privileges granted to accepted accounts, such as a privilege of communicating with other users of the primary web site. Monitored accounts may be granted privileges of accepted accounts, or may be granted some, but not all, of such privileges.

The information from the social networking web sites may be analyzed to produce multiple scores, and the scores weighted and summed to produce a total score. Two thresholds may be used to identify an account as one that is accepted, rejected, or to be monitored for suspicious activity and accepted or rejected at a later time based on such monitoring. Accounts that are monitored may be flagged as malicious accounts and terminated, and the flags of such accounts as well as any others determined to be malicious may be used to update the weights.

Scores may be assigned based on any or all of the number of friends, contacts or recommendations at the social networking web site (the more friends, the higher the score), the length of time such social network web site account has been in existence (the longer the amount of time, the higher the score), account activity of the user at the social networking web site (the more activity, the higher the score, with older activity optionally weighted higher than newer activity, with activity indicative of actual use by the user of the account, such as skill level of a game or games achieved on a gaming web site, number of posts to forums, regularity of log ins and amount of money spent, being weighted higher than activity that may be automated), the location of the user's friends, contacts or recommendations (for users with a longer time of current residence, the more friends having a residence at or near the user's residence, the higher the score, and for users with less time of current residence, the score may be omitted), whether a location of residence reported to the primary website matches a location of residence reported to a social networking web site or is near a work location reported to a social networking web site (with matching residence locations or nearby work locations having a higher score than otherwise), and a score based on the similarity of their friends college attendance (for users under a threshold age, the more friends listing the same college affiliation as the user, the higher the score) or work history (for users over the threshold age, the more friends listing the same employer as the user, the higher the score), such report by the user either coming from their social networking information, the information reported to the primary web site, or both.

The scores are determined to indicate whether the account on the social networking web site is a legitimate account or was opened for the main purpose of obtaining privileges on the primary web site. When a social network account is required to be linked to any account at the primary web site, when used in conjunction with rejecting of a first account opened by a user on the primary web site that is determined to have been used for malicious purposes, and rejecting subsequent accounts at the primary web site linked to the same social network account, the system and method of the present invention can prevent a user from obtaining privileges on the primary web site by simply opening additional accounts at the social network web site.

DETAILED DESCRIPTION OF A PREFERRED EMBODIMENT

Figure 1:
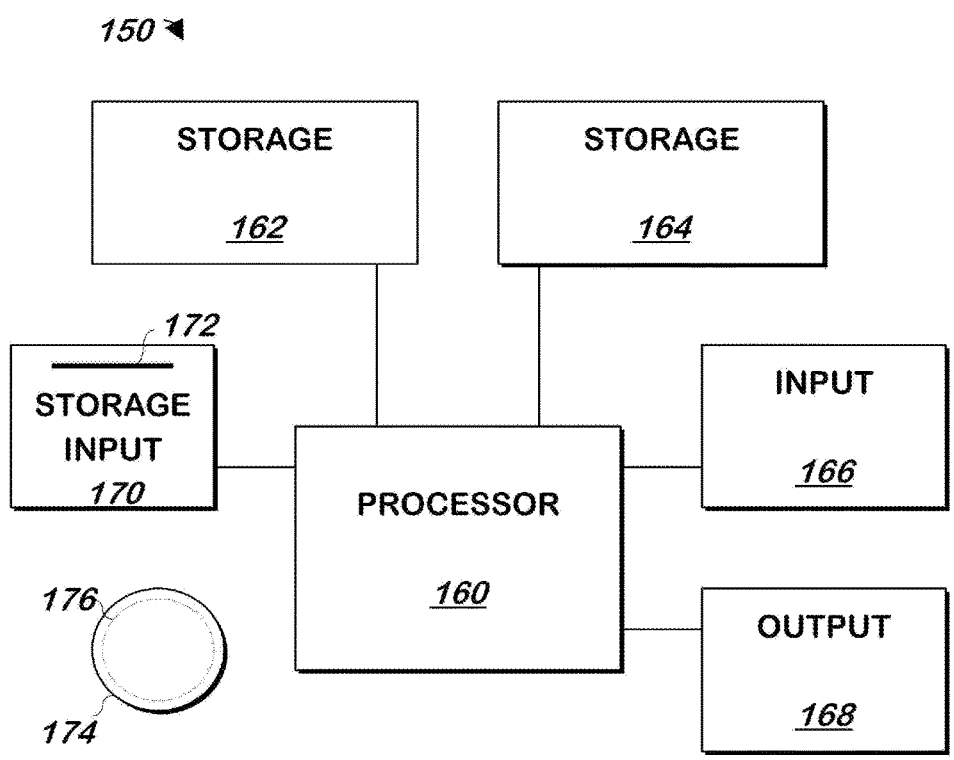
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T-SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XT, VISTA or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID X mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
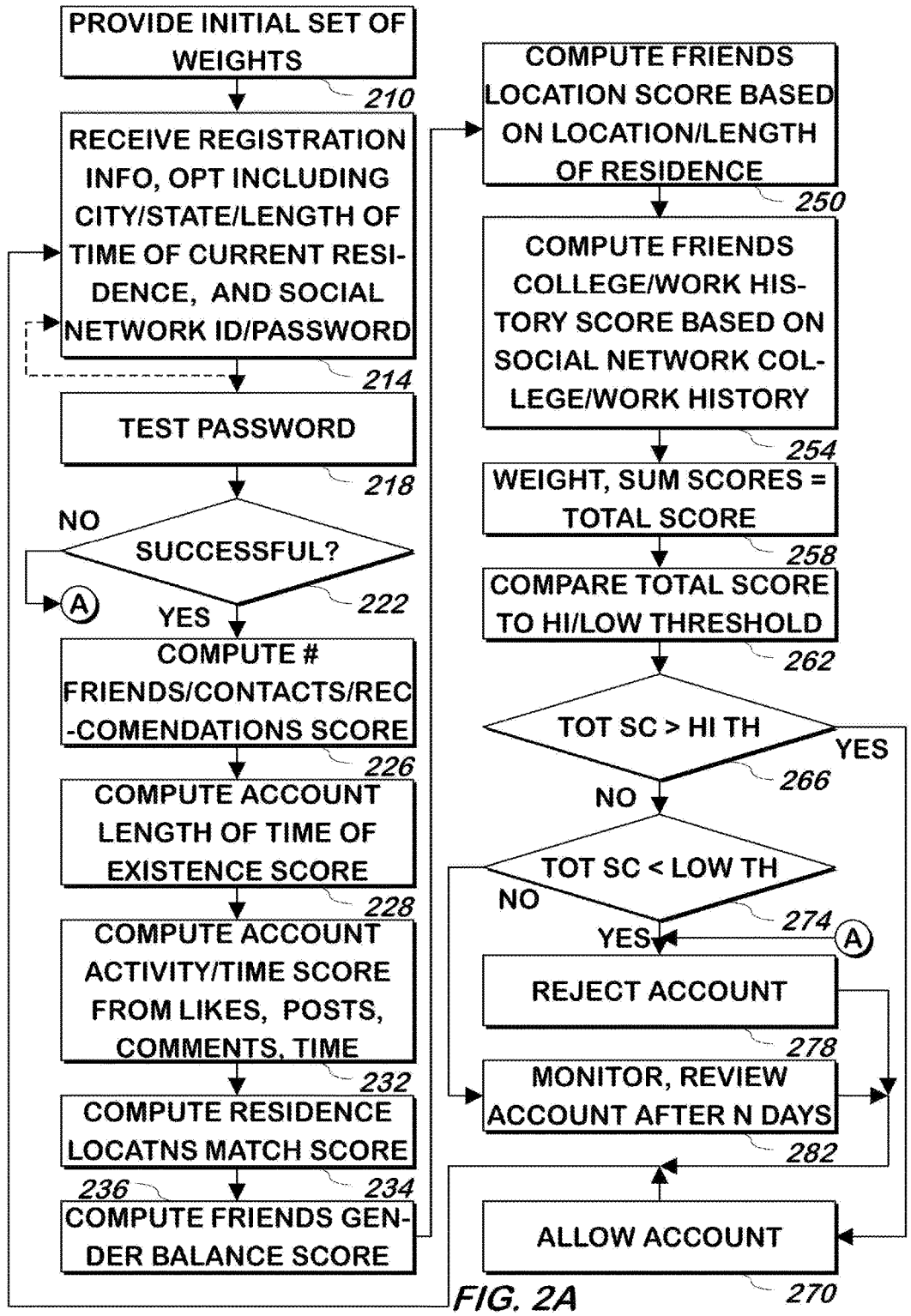
FIG. 2A is a flowchart illustrating a method of accepting or rejecting a user account according to one embodiment of the present invention.
Figure 2B:
FIG. 2B is a flowchart illustrating a method of communicating with users of a primary web site according to one embodiment of the present invention.

FIG. 2A is a flowchart illustrating a method for accepting or rejecting a user account according to one embodiment of the present invention. Referring now to FIG. 2A, an initial set of weights is provided 210. In one embodiment, the initial set of weights may be a set of one or more multipliers, each multiplier corresponding to one or more scores which are calculated as described below. The initial set of weights may be provided as a set of equal multipliers (e.g. all 1s or numbers that add to 1) or a set of varied multipliers assigned by a system administrator or other user.

Registration information for the primary website is received 214 from a user. In one embodiment, registration information received from the user at the primary website may include a primary username and corresponding primary password, as well as the user's social network username and corresponding social network password that provide access to the user's social network account at a social networking website, such as the user's FACEBOOK username and password or LINKEDIN username and password or both. Registration information received from the user may optionally include current residence information, including the city and state of the user's current residence, along with the length of time that the user has been at the current residence. The process of receiving user registration information is an independently occurring process, as shown by the dashed line in the Figure at step 214, and registration information from any number of users may be received at any time.

The received social network password is tested with the received social network username, and an attempt is made to retrieve social network information corresponding to the user's social network account 218. In one embodiment, the social network username and corresponding password are tested to verify that the user owns the social network account for which the user has provided the social network username and corresponding password. Other information may be used to verify that the user owns the social network account, such as checking or testing one or more email addresses associated with the social network account, or any other information.

Social network information may include any information associated with the user's social network account described below, including the number of friends or contacts (i.e. other users of the same social network that are connected to the user via the social network), user identifiers of such friends, the length of time the user's social network account has been active, any account activity information corresponding to the user's activity on the social networking web site (including activity indicative of normal and significant use as opposed to use achievable using a robot or limited amount of use, such as a medium to high skill level of a game or games achieved on a gaming web site, a moderate to high number of posts to forums, regular log ins, and a typical amount of money spent), the user's location, the user's age, and any affiliations such as college affiliations or current or former employees, and any other information corresponding to the user's social network account.

If the social network username and corresponding password are invalid, or if the attempt to retrieve social network information is not successful 222, then the user account is rejected 278. In one embodiment, rejecting the user account involves preventing the posting or sending of information using that account, at least until the user attempting to use the account is independently verified. In one embodiment, the attempt to retrieve social network information may be unsuccessful if the social network username and corresponding password provided by the user are invalid, or if the social network username and password correspond to a non-existent social network account.

If the attempt to retrieve social network information is successful and the social network username and password are valid 222, the retrieved social network information is used to compute one or more scores for the user's social network account, such as a friends/contacts/recommendations score 224, length of time of existence score 228, account activity/time score 230, user location score 234, gender balance score 236, friends/contacts location score 250, and college/work history score 254, which are described in more detail below, and any other score or scores.

The friends/contacts/recommendations score is computed 224. To determine the friends/contacts/recommendations score, the number of friends/contacts (including friends, contacts, recommendations and/or others) associated with the user on the social network is identified. For example, for a FACEBOOK account, the number of friends/contacts may be identified as the number of "friends" linked to the user on the user's FACEBOOK account or the number of "fans" subscribed to the user's FACEBOOK account, or for a LINKEDIN account, the number of friends/contacts may be identified as the number of contacts connected to the user's LINKEDIN account or the number of users that have "recommended" the user's account on the LINKEDIN social networking website. In one embodiment, a high number of identified friends/contacts may receive a higher friends/contacts/recommendations score, and lower number of identified friends/contacts may receive a lower friends/contacts/recommendations score, or vice versa. In one embodiment, a threshold number of friends/contacts may be used to assign the friends/contacts/recommendations score, or the friends/contacts/recommendations score may be assigned in another way.

The length of time of account existence score is computed 228. To determine the time of account existence score, the length of time that the user's social network account has been in existence is identified from the retrieved social network information. For example, if the social network account is a FACEBOOK account, then the date that the user opened his or her FACEBOOK account may be used to identify the length of time that the user's FACEBOOK account has been in existence. In one embodiment, a social network account that has been in existence for a long period of time, for example, a FACEBOOK account that was opened three years prior to the date of scoring, may receive a higher length of time of account existence score than a social network account that has only been in existence for a short amount of time, for example, a social network account opened two weeks, or three days, before the current date or the date the scoring is performed.

The account activity/time score is computed 230. To determine the account activity/time score, the amount of user activity on the user account at the social networking website is identified. For example, the number of posts made by the user at the social networking website, or the number of comments made by the user on posts made by others on the social networking website, or the number of times that the user has otherwise interacted with posts or comments on the social networking website, such as by clicking a "like" button on FACEBOOK, or any activity or combination of activities made on the social networking website by the user may be identified. In one embodiment, a high level of account activity made by the user on the social networking website may receive a higher account activity/time score and a low level of activity on the social networking website may receive a lower account activity/time score, or certain types of activity may receive a higher account activity/time score than other types of activity, or the account activity/time score may be assigned in any other manner using such information.

The more activity consistent with actual and significant use, the higher the account activity/time score, with older activity optionally weighted higher than newer activity as described herein, or regular activity over a longer period of time weighted higher than activity concentrated in a small amount of time. Such activity may include a moderate to high skill level of a game or games achieved on a gaming web site, a moderate to high number of posts to forums, a regularity (e.g. at least twice or more per week) of log ins and a nearly average or above average amount of money spent, and the higher of these, the higher the account activity/time score. Averages and norms for what constitutes moderate to high may be identified using such information from multiple users accounts of the same social networking web site or may be supplied by the operator of the site after determining such information across many or all of its users and entered by a system administrator. Conventional regression analysis may also be used to identify amounts of activity that corresponds to malicious accounts and non malicious accounts, with the differences in activity between the two being used to identify a suitable norm or average.

Additionally, the date of any identified activity on the user's social network account may be used in determining the account activity/time score. In one embodiment, older activity on the social networking website, such as posts or comments made over one year prior to the current date, may receive a higher account activity score than newer activity, such as a post made one day prior to the current date, or vice versa. The account activity/time score may be determined using any of the methods described above, or any combination of the methods described above, or in any other manner.

The user location score is computed 234. To determine the user location score, any user location information received from the user at step 214 may be checked against any user location retrieved with the user's social network information. In one embodiment, a higher user location score may be assigned if the user location information received from the user at the primary web site is consistent (e.g. the same as) with the user location information retrieved from the user's social network account. In one embodiment, a low user location score may be assigned, or a user location score of zero may be assigned, if the user location information received from the user is not consistent with the user location information retrieved from the user's social network account. In one embodiment, a high to medium user location score or a low user location score may be assigned if the user location information received from the user is proximate (e.g. within a threshold distance) to the user location information retrieved from the user's social network account, or the user location score may be assigned in any other manner.

The gender balance score is computed 236. To compute the gender balance score, the number of male friends/contacts (including friends, contacts, recommendations or others) linked to the user, and the number of female friends/contacts linked to the user on the social network are identified and used to determine the gender balance ratio, or ratio of male friends/contacts to female friends/contacts that are linked to the user. In one embodiment, an even gender balance, such as a male to female friends/contacts ratio of 1:1, may receive a higher gender balance score, and an uneven gender balance, such as a male to female friends/contacts ratio of 4:1 may receive a lower gender balance score, or vice versa. In one embodiment, a slightly skewed gender balance, such as a male to female friends/contacts ratio of 1:2 may receive a higher gender balance score than a more extremely skewed gender balance, such as a male to female friends/contacts ratio of 1:5, or vice versa. In one embodiment, a gender balance skewed in the direction of more female friends, such as a male to female friends/contacts ratio of 1:2 may receive a higher gender balance score for users that are female than for users that are male, or vice versa, or a gender balance skewed in the direction of more male friends, such as a male to female friends/contacts ratio of 2:1, may receive a higher gender balance score for users that are female than for users that are male, or vice versa. The gender balance score may be determined by any method described above, or any combination of methods described above, or any other method or methods.

The friends/contacts location score is computed 250 for the user's social network account. To compute the friends/contacts location score, the location of one or more of the user's friends, contacts, recommendations or other users linked to the user through the social network is identified, and the identified location or locations are compared against the user location information provided by the user or retrieved from the user's social network account or both. In one embodiment, a higher number of friends/contacts that are identified as residing in the same location, or in a proximate location, to the user's residence may receive a higher friends/contacts location score, and a lower number of friends/contacts that are identified as residing in the same or proximate location as the user may receive a lower friends/contacts location score, or vice versa.

Information corresponding to the length of time that the user has been at the user's current residence, optionally received at step 214 above, may also be used to determine the friends/contacts location score. In one embodiment, for a user that has been at a current residence for a long period of time, a low number of friends/contacts identified in the same or proximate location as the user may receive a lower friends/contacts location score than the same number of friends/contacts identified for a user that has been at a current residence for a short amount of time, or vice versa, or the friends/contacts location score may be increased for the user that has been at a current residence for a short amount of time, or the friends/contacts location score may be assigned using any combinations of the methods described above or any other methods.

The college/work history score is computed 254. To compute the college/work history score, the college and/or work history information of the user's friends/contacts on the social network are compared to the user's college and/or work history information to identify the number of friends/contacts that have similar college information and/or work history information as the user. In one embodiment, a higher number of friends/contacts identified as having similar college information (e.g. listing the same college affiliation) as the user may receive a higher college/work history score, and a lower number of friends identified as having similar college information as the user may receive a lower college/work history score, or vice versa. In one embodiment, a higher number of friends/contacts identified as having similar work history information as the user (e.g. listing the same current employer as the user or listing the user's current employer as a previous employer or listing a previous employer that is the same as a previous employer of the user or any other employment similarities) may receive a higher college/work history score, and a lower number of friends/contacts identified as having similar work history information as the user may receive a lower college/work history score, or vice versa. In one embodiment, college information is used to determine the college/work history score if the age of the user is under a given college/work history age threshold, or work history information is used if the age of the user is over the given college/work history age threshold, or both college and work history information is used, or any other information is used to determine the college/work history score. The college/work history age threshold may be determined as the average age of recent college graduates, or an age close to the average age of recent college graduates, or it may be any other age. Any number of scores, or additional scores, may be determined for the user using the user's social network information, either alone or in conjunction with the information provided to the primary web site.

Each computed score is weighted, and the weighted scores are summed to calculate a total score for the user's social network account 258. In one embodiment, the weight corresponding to each score is identified using the most recently identified set of weights, either the set of weights initially received at step 210 or the updated set identified as described below in FIG. 3B, and each score computed above is weighted by multiplying the score times the weight assigned to that score. The weighted scores are summed together to calculate the total score.

The total score is compared 262 to a high score threshold and a low score threshold or both. In one embodiment, the high score threshold is a lower limit threshold for allowing the user's account at the primary website, and the low score threshold is an upper limit threshold for rejecting the user's account at the primary website.

If the total score for the user's social network account is higher than the high score threshold 266, then the user's account at the primary website is allowed 270 and the user will be allowed to communicate with one or more other users of the primary web site, using the website. If the total score for the user's social network account is lower than the low score threshold 274, then the user's account at the primary website is rejected 278 and the user will not be able to communicate with any users of the primary web site using the website.

If the total score for the user's social network account is not higher than the high score threshold 266 and not lower than the low score threshold 274, then the user's account at the primary website may be marked as an unknown account, and the user's account is monitored and reviewed 282. In one embodiment, the user's account may be monitored by tracking the user's activity at the primary website or monitoring the user's activity at the user's social networking website, and the user's account at the primary website may be reviewed by re-scoring the user's social network account using the scoring method described above after a set number of days, or at intervals, or in any manner at any time. In one embodiment, the high score threshold may be equal to the low score threshold, and user accounts may not be monitored.

Figure 3A:
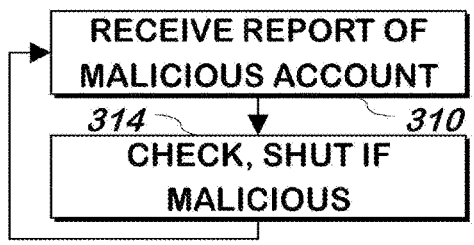
FIG. 3A is a flowchart illustrating a method of shutting a malicious account according to one embodiment of the present invention.

FIG. 3A is a flowchart illustrating a method for reducing or eliminating the number of malicious accounts on a network according to one embodiment of the present invention. Referring now to FIG. 3A, a possible malicious account is identified or a report of a possible malicious account is received 310. In one embodiment, a user account that is being monitored or reviewed as described above may be identified as a possible malicious account, or a report of a possible malicious account may be received from one or more users with an account at the primary website, such as a recipient of spam from the reported account, or from another source, and any number of possible malicious accounts may be identified or reported at any time.

The reported account, or the account identified as possibly malicious, is checked, and any accounts verified as malicious accounts are shut down, rejected, or eliminated 314 so that the user cannot communicate with any users of the primary website using the website or enjoy other privileges associated with an accepted account.

Figure 3B:
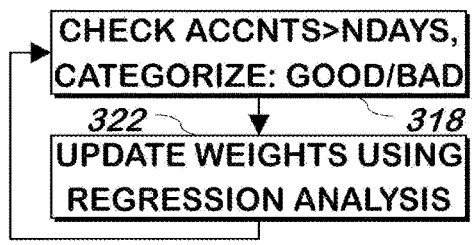
FIG. 3B is a flowchart illustrating a method of updating weights used for scoring according to one embodiment of the present invention.

FIG. 3B is a flowchart illustrating a method for updating the weights used to identify malicious accounts according to embodiment of the present invention. Referring now to FIG. 3B, any unknown accounts, or accounts that have been identified as accounts to monitor or review, that have been active for longer than a threshold amount of time are checked and categorized into good accounts and bad accounts 318. In one embodiment, an unknown account may be checked automatically, such as by tracking the number of emails sent from the unknown account, or the unknown account may be checked manually, such as a system administrator manually reviewing any activity from the unknown account, or the unknown account may be checked automatically and manually, or in any manner to check for spam or other malicious activity. In one embodiment, any unknown account identified as malicious is eliminated and categorized as a bad account. If an unknown account is not identified as malicious, then the account is categorized as a good account. Bad accounts may be shut down, preventing the user from communicating with any users of the primary website using the primary website.

The set of weights to be applied to the scores is updated 322 using conventional regression analysis. In one embodiment, conventional regression analysis of categorized account information, applied to any information corresponding to unknown accounts that have been categorized as good accounts and bad accounts, or any other information, is used to update the set of weights.

System.

Figure 4B:
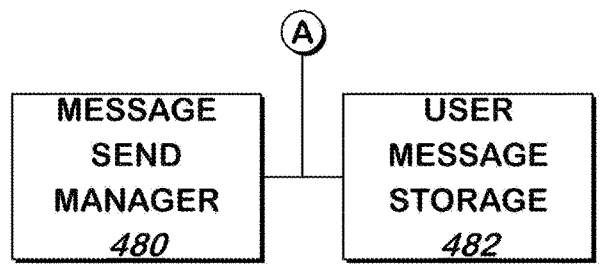
FIG. 4, consisting of FIGS. 4A and 4B, is a block schematic diagram of a system for accepting or rejecting a user account according to one embodiment of the present invention.

FIG. 4, consisting of FIGS. 4A and 4B, is a block schematic diagram of a system 400 for accepting or rejecting new accounts on a network according to one embodiment of the present invention. Referring now to FIG. 4, consisting of FIGS. 4A and 4B, the system contains any number of social networking systems 402 and user systems 404, though other arrangements may be used. Social networking systems 402 are conventional social network systems such as FACEBOOK, or LINKEDIN, operate as described herein, and communicate with a representative user system 400 via network 406, which includes a conventional TCP/IP-compatible communication interface running suitable communications protocols such as TCP/IP, Ethernet or both, and is coupled to a network such as an Ethernet network, the Internet, or both. All communications provided to and received from the user may be made at representative user system 404, which may include a conventional personal computer system with a conventional browser coupled to the Internet using suitable communications techniques. Unless otherwise specified, all communication to and from the representative system 400 is made via input/output 409 of communication interface 408. System 400 may include a conventional web server to provide services.

An initial set of weights, described above, are provided, such as by a system administrator via a user interface, such as a web page, provided by initial weights manager 410. In one embodiment, the initial set of weights may be identified using conventional regression analysis on existing user accounts that are already known to be bad or rejected, as well as some or all that known to be good or accepted, in the manner described above and below, or by using conventional regression analysis on representative bad and good user accounts to distinguish good accounts from bad ones as described herein, or the initial set of weights may be identified in another manner. Initial weights manager 410 receives the initial set of weights, described above, and stores the initial set of weights in weights storage 472. As described herein, all storage within the system, including weights storage 472, user information storage 412, and user message storage 482, may be computer memory or disk storage or any other type of storage.

A user registers an account with registration manager 414. In one embodiment, registration manager 414 builds a web page containing suitable user interface elements that allow the user to provide registration information, described above, and returns it to the user's browser in response. The user fills out the web page with the registration information, including a username and corresponding password for the web site run by system 400, and a social network username and corresponding social network password which allows access to the user's social network account at a social networking website such as FACEBOOK or LINKEDIN, as described above, operated by social networking systems 402, and optionally current residence information, such as the city and state of the user's current residence and the amount of time that the user has been at the current residence, as described above, and any other information required to register a new account. Registration manager 414 receives the registration information and optional current residence information, validates the information (for example checking for a primary username that is already registered, etc) and if the validation is successful, stores such information in user information storage 412 associated with a unique user identifier. In one embodiment, registration manager 414 may store the social network username and corresponding password in user information storage 412 along with the URL for the social networking website, or another identifier, corresponding to the social network for which the social network username and password are provided. Registration manager 414 may receive and store registration information and optional current residence information in user information storage 412 for any number of users at any time.

Social network retrieval manager 418 retrieves the social network username, corresponding social network password and the social network identifier associated with the user identifier in user information storage 412, attempts log in to the user's social network account to retrieve social network information corresponding to the social network account, as described above, and sends the social network username, corresponding social network password, and user identifier to social network retrieval success manager 422. Social network retrieval manager 418 stores any retrieved social network information in user information storage 412 associated with the user account on system 400 for which the social information network information is retrieved. In one embodiment, social network retrieval manager 418 may be unable to retrieve social network information, and in such a case, may not store any social network information in user information storage 412.

Social network retrieval success manager 422 receives the social network username, corresponding password, and user identifier, and tests the validity of the social network username and corresponding password by determining if any other social network information is stored associated with that user identifier and password in user information storage 412. If social network retrieval success manager 422 determines that the social network username and password are not valid, or otherwise determines that the social network account does not belong to the user for whom the social network username and password are received, it signals accept/reject/monitor manager 462 to reject the account, as described above, and accept/reject/monitor manager 462 receives the signal and complies. In one embodiment, accept/reject/monitor manager 462 rejects the account by shutting the account down so that the user account cannot communicate with other user accounts, as described above, and/or marking the account as rejected in user information storage 412.

If social network retrieval success manager 422 determines that the social network username and password are valid, social network retrieval success manager 422 signals number of friends scorer 426 to compute the friends/contacts/recommendations score for the social network account as described above, and number of friends scorer 426 receives the signal. In one embodiment, social network retrieval success manager 422 sends the signal to compute the friends/contacts/recommendations score with the user identifier corresponding to the user account for which the social network username and password are verified.

Each of the elements 426-458 receives the user identifier, retrieves appropriate social network information corresponding to the user identifier in user information storage 412 (or receives it, for example, from a system administrator) and performs the step, shown in FIG. 2A and described above, having the reference number 200 lower than the element reference number (e.g. 426 of FIG. 4A performs step 226 of FIG. 2A). Each of the elements 426-458 stores the resulting score into user information storage 412 associated with received user identifier and signals the next higher element 428-458 with the same user identifier. For example, number of friends scorer 426 receives the user identifier, retrieves social network information from user information storage 412 that corresponds to the received user identifier and determines a friends/contacts/recommendations score for the social network account, as described above. Number of friends scorer 426 stores the friends/contacts/recommendations score in user information storage 412 associated with the received user identifier and signals length of account time scorer 428 with the user identifier. Total score manager 458 signals accept/reject/monitor manager 462 after it completes the computation of the total score, as described above, and includes the user identifier.

When accept/reject/monitor manager 462 receives the signal and user identifier from total score manager 458, accept/reject/monitor manager 462 compares the total score for the user's social network account to the lower limit high score threshold and upper limit low score threshold, as described above. To compare the total score, accept/reject/monitor manager 462 retrieves the total score for the user's social network account from user information storage 412. If accept/reject/monitor manager 462 determines that the total score is higher than the high score threshold, it accepts the account, allowing the account to communicate with other user accounts as described above, and marks the account as accepted in user information storage 412. If accept/reject/monitor manager 462 determines that the total score is lower than the low score threshold, it rejects the account, denying the account from communicating with other user accounts as described above, and marks the account as rejected in user information storage 412. If accept/reject/monitor manager 462 determines that the total score is lower than the high score threshold and higher than the low score threshold, it allows and monitors the account, as described above, and marks the account as monitored in user information storage 412. As described above, if the high score threshold is equal to the low score threshold, accept/reject/monitor manager 462 may not mark any accounts and monitored in user information storage 412.

A user with an account that has been marked as accepted or monitored in user information storage 412 may send emails from such a user account to other accounts on system 400 via message send manager 480, and otherwise, a user may not send such emails. Other privileges may be denied based on acceptance of such accounts. Message send manager 480 stores any user emails sent from the user account in user message storage 484 and notifies the recipients of any such emails using conventional techniques.

At any time, account monitor manager 466 may receive any number malicious account reports. If account monitor manager 466 receives a report of a malicious account, it checks the reported account, as described above, or a system administrator checks the reported account, as described above. If an account is determined to be malicious by account monitor manager 466 or the system administrator or both, account monitor manager 466 shuts the account down as described above.

Account monitor manager 466 may also check any user accounts that are older than a threshold amount of time (i.e. accounts that have been active for a threshold amount of time) and are marked as monitored in user information storage 412. Account monitor manager 466 categorizes any monitored accounts it has checked into good accounts and bad accounts, as described above, and marks the monitored accounts as good or bad in user information storage 412.

Weights update manager 470 uses conventional regression analysis to calculate updated weights information, as described above, and stores any such updated weights information in weights storage 472. To use regression analysis and calculate updated weights information, weights update manager 470 may first retrieve current weights information from weights storage 472 and retrieve any scores information corresponding to rejected user accounts or monitored user accounts, or any other information corresponding to any other accounts, from user information storage 412. Weights update manager 470 may update weights information in weights storage 470 at any time.

Summary

There has been shown a method of granting at least one privilege to a user on a first web site, including receiving information that can be used to access the user's account on a second web site, retrieving information from the user's account on the second website responsive to the information received, performing an analysis of the information retrieved, and granting to the user the at least one privilege on the first web site responsive to the performing the analysis step. The performing the analysis may optionally include analyzing a set of connections between the user's account on the second web site and a plurality other users of the second web site with which the user has established connections. The analyzing is optionally responsive to at least one date. The performing the analysis is optionally responsive to a length of time of the user's account at the second web site. The performing the analysis is optionally responsive to an amount or type of activity recorded on the account at the second web site. The method may optionally additionally include receiving information about the user at the first web site, and the performing the analysis step may optionally include identifying a correspondence between the information received by the user at the first web site and the information retrieved from the account of the user on the second web site.

There has been shown a system for granting at least one privilege to a user on a first web site, the system including a registration manager having an input coupled for receiving information that can be used to access the user's account on a second web site, the registration manager for providing at an output the received information that can be used to access the user's account, a social network retrieval manager having an input coupled to the registration manager output for receiving the information that can be used to access the user's account, the social network retrieval manager for retrieving via an input/output information from the user's account on the second web site responsive to the information that can be used to access the user's account and for providing at an output the information from the user's account on the second web site, at least one scorer having an input coupled to the social network retrieval manager output for receiving at least some of the information from the user's account at the second web site, each of the at least one manager for performing an analysis of the information retrieved and providing at an output at least one result of that analysis, and an accept/reject/monitor manager having an input coupled to the at least one scorer for receiving the result of the analysis of each of the at least one scorer, the accept/reject/monitor manager for providing at an output an indication that the at least one privilege on the first web site has been granted responsive to the result of the analysis received from each of the at least one scorers. The system may include a feature wherein at least one of the at least one scorer performs the analysis by analyzing a set of connections between the user's account on the second web site and a plurality other users of the second web site with which the user has established connections. The system may include a feature wherein the analyzing is responsive to at least one date. The system may include the feature wherein at least one of the at least one scorer performs the analysis responsive to a length of time of the user's account at the second web site. The system may include the feature wherein at least one of the at least one scorer performs the analysis responsive to an amount or type of activity recorded on the account at the second web site. The system may include the feature wherein the registration manager input is additionally for receiving information about the user at the first web site and the registration manager may be additionally for providing the information about the user received at the registration manager input at the registration manager output, at least one input of the at least one scorer is coupled to the registration manager output for receiving the information about the user, and at least one of the at least one scorer performs the analysis by identifying a correspondence between the information received by the user at the first web site and the information retrieved from the account of the user on the second web site.

There has been shown a computer program product including a computer useable medium having computer readable program code embodied therein for granting at least one privilege to a user on a first web site, the computer program product including computer readable program code devices configured to cause a computer system to receive information that can be used to access the user's account on a second web site, retrieve information from the user's account on the second website responsive to the information received, perform an analysis of the information retrieved, and grant to the user the at least one privilege on the first web site responsive to the performing the analysis step. The computer program product may include a feature wherein the computer readable program code devices configured to cause the computer system to perform the analysis comprise computer readable program code devices configured to cause the computer system to analyze a set of connections between the user's account on the second web site and a plurality other users of the second web site with which the user has established connections. The computer program product may include the feature wherein the computer readable program code devices configured to cause the computer system to analyze are responsive to at least one date. The computer program product may include the feature wherein the computer readable program code devices configured to cause the computer system to perform the analysis are responsive to a length of time of the user's account at the second web site. The computer program product may include a feature, wherein the computer readable program code devices configured to cause the computer system to perform the analysis are responsive to an amount or type of activity recorded on the account at the second web site. The computer program product may additionally include computer readable program code devices configured to cause the computer system to receive information about the user at the first web site, and the computer readable program code devices configured to cause the computer system to perform the analysis may include computer readable program code devices configured to cause the computer system to identify a correspondence between the information received by the user at the first web site and the information retrieved from the account of the user on the second web site.

The second web site may be a social network, a gaming web site or any other type of web site.

What is claimed is:

1. A method of granting at least one privilege to a user on a first web site, comprising:
   receiving a user identifier and password that can be used to access information from the user's account on a second web site;
   retrieving information from the user's account on the second web site responsive to the user identifier and password received;
   generating at least one score by identifying a ratio of genders of a plurality of the user's contacts on the second web site;
   comparing the at least one score to at least one threshold; and
   granting to the user the at least one privilege on the first web site responsive to the comparing the at least one score step.

2. The method of claim 1, wherein the at least one score is generated additionally by comparing any two of:
   location information for the user on the first web site;
   location information for the user on the second web site; and
   location information for at least one of the user's contacts on the second web site.

3. The method of claim 1, wherein the at least one score is generated additionally by comparing a first post-secondary-education-organization affiliation of the user and a second post-secondary-education-organization affiliation of at least one contact of the user on the second web site.

4. The method of claim 1, wherein the at least one privilege comprises communication by the user with other users of the first web site.

5. The method of claim 1, wherein the at least one score comprises a total score, and the granting the user at least one privilege step comprises:
   responsive to the total score being in a first range, granting the user the at least one privilege without further monitoring the user;
   responsive to the total score being in a second range, not granting the user the privilege; and
   responsive to the total score being in a third range between the first range and the second range, granting the user the privilege while further monitoring the user.

6. The method of claim 1, wherein:
   the second web site comprises a social network and;
   the first web site allows communication among the users of the web site.

7. A system for granting at least one privilege to a user on a first web site, comprising:
   a registration manager having an input coupled for receiving a user identifier and password that can be used to access the user's account on a second web site, the registration manager for providing at an output the received user identifier and password that can be used to access the user's account on the second web site;
   a social network retrieval manager comprising a hardware processor coupled to a memory and having an input coupled to the registration manager output for receiving the user identifier and password that can be used to access the user's account, the social network retrieval manager for retrieving via an input/output information from the user's account on the second web site responsive to the user identifier and password that can be used to access the user's account and for providing at an output the information from the user's account on the second web site;
   at least one scorer or score manager comprising the hardware processor coupled to the memory and having an input coupled to the social network retrieval manager output for receiving at least some of the information from the user's account at the second web site, each of the at least one scorer or score manager for generating at least one score using the information retrieved and providing at an output at least one result of that analysis, wherein the at least one score is generated by identifying a ratio of genders of a plurality of the user's contacts on the second web site; and
   an accept/reject/monitor manager comprising the hardware processor coupled to the memory and having an input coupled to the output of the at least one scorer or score manager for receiving the at least one score from each of the at least one scorer or score manager, the accept/reject/monitor manager for comparing the at least one score to at least one threshold, and for providing at an output an indication that the at least one privilege on the first web site has been granted responsive to the comparing the at least one score to at least one threshold.

8. The system of claim 7 wherein the at least one scorer or score manager generates the at least one score by comparing of any two of:
   location information for the user on the first web site;
   location information for the user on the second web site; and
   location information for at least one of the user's contacts on the second web site.

9. The system of claim 7 wherein the at least one scorer or score manager generates the at least one score by comparing a first post-secondary-education-organization affiliation of the user and a second post-secondary-education-organization affiliation of at least one contact of the user on the second web site.

10. The system of claim 7, wherein the at least one privilege comprises communication by the user with other users of the web site.

11. The system of claim 7, wherein:
   the accept/reject/monitor manager is additionally for computing a total score responsive to the at least one score received from each of the at least one scorer or score manager;
   the accept/reject/monitor manager provides at the accept/reject/monitor manager output the indication that the at least one privilege on the first web site has been granted by providing:
      responsive to the total score being in a first range, an indication that the user has been granted the at least one privilege without further need to monitor the user;
      responsive to the total score being in a second range, an indication that the user has not been granted the privilege; and
      responsive to the total score being in a third range between the first range and the second range, an indication that the user has been granted the privilege while further monitoring the user is warranted.

12. The system of claim 7, wherein the second web site comprises a social network and the first web site allows communication among the users of the web site.

13. A computer program product comprising a nontransitory computer useable medium having computer readable program code embodied therein for granting at least one privilege to a user on a first web site, the computer program product comprising computer readable program code devices configured to cause a computer system to:
   receive a user identifier and password that can be used to access information from the user's account on a second web site;
   retrieve information from the user's account on the second web site responsive to the user identifier and password received;
   generate at least one score by identifying a ratio of genders of a plurality of the user's contacts on the second web site;
   compare the at least one score to at least one threshold; and
   grant to the user the at least one privilege on the first web site responsive to the comparing the at least one score step.

14. The computer program product of claim 13, wherein the computer readable program code devices configured to cause the computer system to generate the at least one score generate the at least one score additionally by comparing any two of:
   location information for the user on the first web site;
   location information for the user on the second web site; and
   location information for at least one of the user's contacts on the second web site.

15. The computer program product of claim 13, wherein the computer readable program code devices configured to cause the computer system to generate the at least one score generate the at least one score additionally by comparing a first post-secondary-education-organization affiliation of the user and a second post-secondary-education-organization affiliation of at least one contact of the user on the second web site.

16. The computer program product of claim 13, wherein the at least one privilege comprises communication by the user with other users of the first web site.

17. The computer program product of claim 13, wherein the at least one score comprises a total score, and the computer readable program code devices configured to cause the computer system to grant the user at least one privilege comprise computer readable program code devices configured to cause the computer system to:
- responsive to the total score being in a first range, grant the user the at least one privilege without further monitoring the user;
- responsive to the total score being in a second range, not grant the user the privilege; and
- responsive to the total score being in a third range between the first range and the second range, grant the user the privilege while further monitoring the user.

18. The computer program product of claim 13, wherein:
the second web site comprises a social network and;
the first web site allows communication among the users of the web site.

\* \* \* \* \*